United States Patent
Comer et al.

(10) Patent No.: US 7,912,125 B2
(45) Date of Patent: *Mar. 22, 2011

(54) HYBRID SCALABLE ENCODER, METHOD AND MEDIA FOR STANDARD DEFINITION AND HIGH-DEFINITION VIDEO FORMATS ON A SINGLE-DISC

(75) Inventors: Mary Lafuze Comer, Fairmount, IN (US); Shu Lin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1512 days.

This patent is subject to a terminal disclaimer.

(21) Appl. No.: 10/537,083

(22) PCT Filed: Nov. 13, 2003

(86) PCT No.: PCT/US03/36171
§ 371 (c)(1),
(2), (4) Date: Jun. 1, 2005

(87) PCT Pub. No.: WO2004/052002
PCT Pub. Date: Jun. 17, 2004

(65) Prior Publication Data
US 2006/0056520 A1    Mar. 16, 2006

Related U.S. Application Data

(60) Provisional application No. 60/430,558, filed on Dec. 3, 2002.

(51) Int. Cl.
*K04N 7/12*    (2006.01)
*G06K 9/36*    (2006.01)

(52) U.S. Cl. .................................. 375/240.1; 382/240

(58) Field of Classification Search .............. 375/240.1, 375/240.03, 240.11, 240.08; 382/240
See application file for complete search history.

(56) References Cited

U.S. PATENT DOCUMENTS

| 5,973,739 A | 10/1999 | Nilsson |
| 6,057,884 A | 5/2000 | Chen et al. |

(Continued)

FOREIGN PATENT DOCUMENTS

CN    1355995    6/2002

(Continued)

OTHER PUBLICATIONS

Search Report Dated April 21, 2004.

(Continued)

*Primary Examiner* — Gims S Philippe
(74) *Attorney, Agent, or Firm* — Robert D. Shedd; Paul P. Kiel; Guy H. Eriksen

(57) ABSTRACT

A hybrid scalable encoder, method, and media are disclosed for processing video signal data as a plurality of block transform coefficients for each of a base layer and an enhancement layer included on a dual standard-definition and high-definition disc. The encoder includes a two-layer decomposition unit for decomposing an original high-definition signal data sequence into base layer data and enhancement layer data, a standard-definition encoder coupled to the decomposition unit for encoding the base layer data as a base layer bitstream embodying a standard-definition data sequence, and a high-definition encoder coupled to the decomposition unit and the standard-definition encoder for encoding the difference between the high-definition data and the standard-definition data as an enhancement layer bitstream embodying a high-definition data sequence.

13 Claims, 6 Drawing Sheets

U.S. PATENT DOCUMENTS

| | | | |
|---|---|---|---|
| 6,639,943 B1* | 10/2003 | Radha et al. | 375/240.11 |
| 6,771,703 B1* | 8/2004 | Oguz et al. | 375/240.03 |
| 2001/0038746 A1 | 11/2001 | Hughes | |
| 2004/0252900 A1* | 12/2004 | Bruls | 382/240 |
| 2006/0062295 A1* | 3/2006 | Lin et al. | 375/240.08 |

FOREIGN PATENT DOCUMENTS

| | | |
|---|---|---|
| EP | 0739139 A2 | 10/1996 |
| EP | 0883300 A2 | 9/1998 |
| JP | 11150706 | 6/1999 |
| KR | 1999006678 | 1/1999 |
| WO | 9320650 A1 | 10/1993 |
| WO | WO0139503 | 5/2001 |
| WO | WO0177871 | 10/2001 |

OTHER PUBLICATIONS

Delonge P., Compatible Boding of Digital Interlaced HDTV. IEEE Journal on Selected Areas in Communications, IEEE Service Center, Piscataway, NJ US. vol. 11 No. 1. Jan. 1, 1993. XP000378006.

Supplementary European Search Report dated Jun. 12, 2009.

* cited by examiner

HYBRID SCALABLE ENCODER, METHOD AND MEDIA FOR STANDARD DEFINITION AND HIGH-DEFINITION VIDEO FORMATS ON A SINGLE-DISC

CROSS-REFERENCE TO RELATED APPLICATIONS

This application claims the benefit, under 35 U.S.C. §365 of International Application PCT/US03/36171, filed Nov. 13, 2003, which was published in accordance with PCT Article 21(2) on Jun. 17, 2004 in English and which claims the benefit of U.S. provisional patent application No. 60/430,558, filed Dec. 3, 2002.

FIELD OF THE INVENTION

The present invention is directed towards video CODECS, and in particular, towards video CODECS for integrating standard-definition and high-definition versions of video data on a single digital video disc.

BACKGROUND OF THE INVENTION

Video data is generally processed in the form of bit streams by video encoders and decoders (collectively "CODECs"), and stored on digital video disc ("DVD") media. There is a substantial installed user base of red laser DVD players using MPEG-2 decoders. Red laser devices used with MPEG-2 encoding result in storage capacities sufficient to support standard-definition ("SD") versions of typical movies, while there is great interest in supporting high-definition ("HD") versions of these movies on the same disc. Unfortunately, the installed user base of red laser players used with MPEG-2 support a storage capacity insufficient for holding both SD and HD versions of typical movies.

Red laser and blue laser technologies have both been considered for reaching storage capacities sufficient to support high-definition recordings ("HD-DVD"). The blue laser technology has the advantage of providing sufficient storage to hold multiple high-quality HD movies on one disc using MPEG-2, but it is not yet economically feasible to use blue lasers to supplant the installed user base of red laser devices. Hence, there is a need for a coding scheme usable for HD-DVD that can also support SD-DVD on the same disc readable by current red laser devices using MPEG-2 decoders.

Thus, with red laser HD-DVD, it is desirable to store on a single disc, in addition to the HD version, an SD version of a movie that can be read by a current player having an MPEG-2 decoder. This would mean that content creators would not need to make a separate HD-DVD disc in addition to the SD disc, and retailers would need to stock only one disc per movie, using just one stock keeping unit ("SKU"). This may avoid problems such as those encountered with broadcast high-definition television ("HDTV"), where broadcasters did not want to transmit HD until more HD sets were sold, but consumers did not want to buy HD sets until there was more HD content available.

The present invention assumes the use of single-sided storage media. While double-sided discs are an option for obtaining more storage, there is some resistance to using both sides of the disc. This is due in part to the disadvantages of increased cost and of the fact that storing content on both sides interferes with the labeling that is normally put on one side of a disc. Accordingly, the approaches for HD-DVD of (i) blue laser technology; (ii) double-sided red laser discs; and (iii) separate red laser discs for HD and SD versions of a movie; each have significant drawbacks and disadvantages.

SUMMARY OF THE INVENTION

These and other drawbacks and disadvantages of the prior art are addressed by a hybrid scalable encoder, method, and media for processing video signal data as a plurality of block transform coefficients for each of a base layer and an enhancement layer included on a dual standard-definition and high-definition disc. The encoder includes a two-layer decomposition unit for decomposing an original high-definition signal data sequence into base layer data and enhancement layer data, a standard-definition encoder coupled to the decomposition unit for encoding the base layer data as a base layer bitstream embodying a standard-definition data sequence, and a high-definition encoder coupled to the decomposition unit and the standard-definition encoder for encoding the difference between the high-definition data and the standard-definition data as an enhancement layer bitstream embodying a high-definition data sequence.

These and other aspects, features and advantages of the present invention will become apparent from the following description of exemplary embodiments, which is to be read in connection with the accompanying drawings.

BRIEF DESCRIPTION OF THE DRAWINGS

The invention utilizes hybrid scalable video CODECs for integrating standard-definition ("SD") with high-definition ("HD") on a single digital video disc ("DVD") in accordance with the following exemplary figures, in which.

DETAILED DESCRIPTION OF PREFERRED EMBODIMENTS

Figure 1:
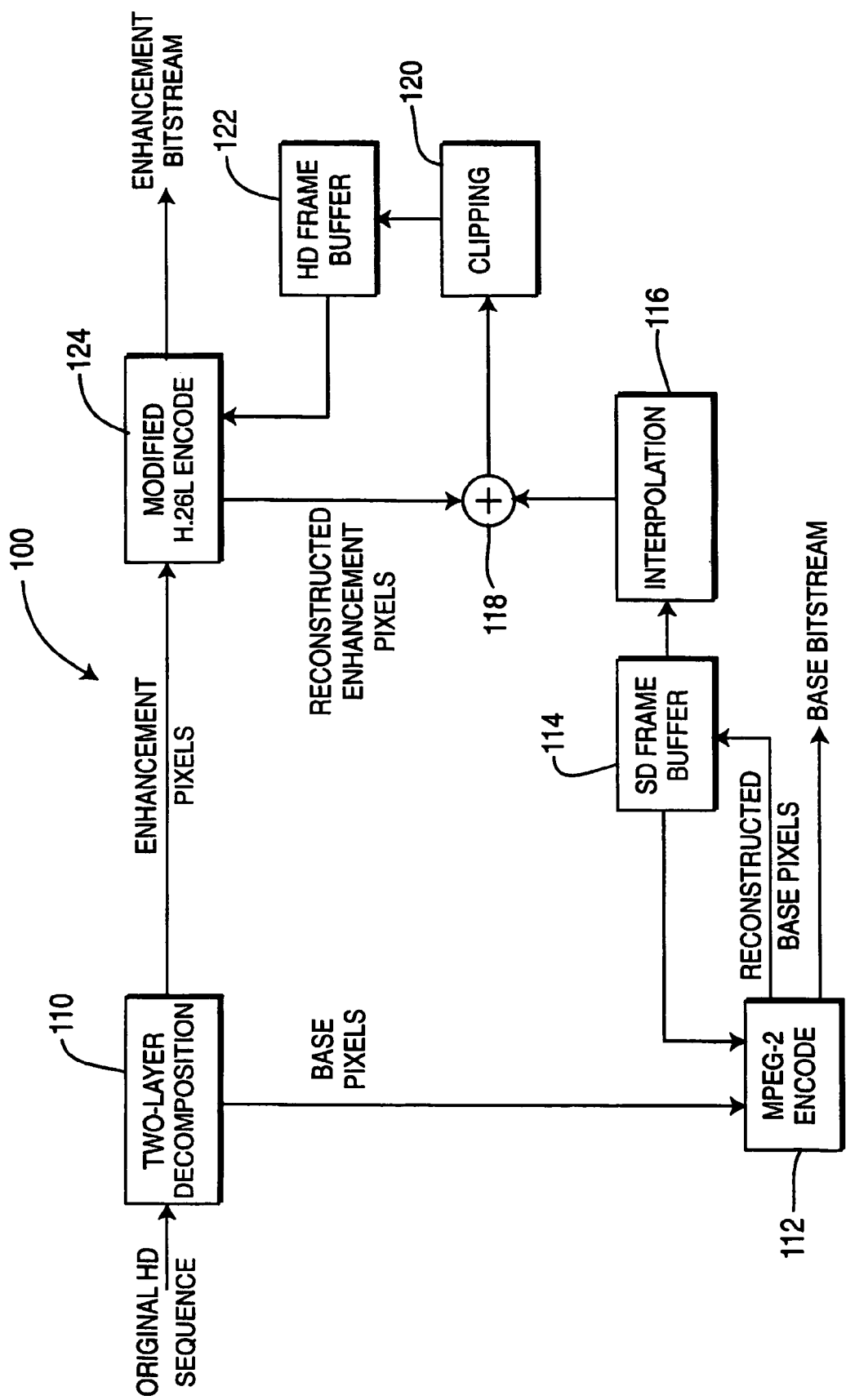
FIG. 1 shows a block diagram for a hybrid scalable encoder, in accordance with the principles of the present invention.

We have recognized the need for and contemplated the use of at least two approaches for providing standard-definition ("SD") and high-definition ("HD") versions of a movie on a single red-laser disc. A first approach is that of providing single-disc SD and HD using red laser with simulcast MPEG-2 for SD and H.26L for HD. A second approach is that of providing single-disc SD and HD using red laser with a hybrid scalable approach using MPEG-2 for the base layer and a modified H.26L for the enhancement layer.

For storing SD and HD on one disc, the two options of simulcast and scalability are now considered. Due to storage capacity constraints with red laser DVD, MPEG-2 may not be sufficient for the HD layer. The simulcast approach records independent MPEG-2 SD and H.26L HD streams on the disc, and the scalable approach uses MPEG-2 for the base layer and a modified H.26L for the enhancement layer.

For comparison purposes, total bitrates of 7, 8, and 9 Mbps are considered. For each of these total bitrates, Tables 1 and 2 presents the estimated performance of the disclosed hybrid scalable and the simulcast approaches, respectively, for several different cases. The performance is estimated in terms of equivalent MPEG-2 HD bitrate. Equivalent MPEG-2 HD bitrate for a particular case is the MPEG-2 bitrate that would be required to achieve similar quality to the HD layer for that case.

TABLE 1

Estimated Hybrid Scalability Performance

| SD Bitrate | HD Bitrate | H.26L Improvement Factor | Equivalent MPEG-2 HD Bitrate |
|---|---|---|---|
| 3 | 4 | 2 | 9.9 |
| 3 | 4 | 2.5 | 11.7 |
| 3 | 5 | 2 | 11.7 |
| 3 | 5 | 2.5 | 13.95 |
| 3 | 6 | 2 | 13.5 |
| 3 | 6 | 2.5 | 16.2 |
| 4 | 4 | 2 | 10.8 |
| 4 | 4 | 2.5 | 12.6 |
| 4 | 5 | 2 | 12.6 |
| 4 | 5 | 2.5 | 14.85 |

TABLE 2

Estimated Simulcast Performance

| SD Bitrate | HD Bitrate | H.26L Improvement Factor | Equivalent MPEG-2 HD Bitrate |
|---|---|---|---|
| 3 | 4 | 2 | 8 |
| 3 | 4 | 2.5 | 10 |
| 3 | 5 | 2 | 10 |
| 3 | 5 | 2.5 | 12.5 |
| 3 | 6 | 2 | 12 |
| 3 | 6 | 2.5 | 15 |
| 4 | 4 | 2 | 8 |
| 4 | 4 | 2.5 | 10 |
| 4 | 5 | 2 | 10 |
| 4 | 5 | 2.5 | 12.5 |

For each total bitrate, two different SD bitrates are listed: 3 and 4 Mbps. In addition, two different improvement factors are used for H.26L over MPEG-2: 2 and 2.5. This means that MPEG-2 at either 2 times or 2.5 times the bitrate is considered to provide similar quality to H.26L at 1 times the bitrate.

The performance for the simulcast case of Table 2 is obtained by multiplying the HD bitrate by the H.26L improvement factor. The estimated performance for the hybrid scalability approach of Table 1 is obtained by multiplying the HD bitrate by the H.26L improvement factor, adding the SD bitrate, and multiplying by a factor of 0.9 to compensate for the loss in coding efficiency due to scalability. The 0.9 factor is an estimate based on previous experience.

The shaded rows in Tables 1 and 2 indicate cases that may be expected to provide sufficient quality for HD-DVD. Comparing the tables, more rows in Table 1 are shaded. Looking at Table 2, it can be seen that for the simulcast approach to provide acceptable quality, either 1) H.26L must provide 2.5× improvement over MPEG-2 and 3 Mbps must be sufficient for the SD layer, or 2) 9 Mbps must be used for the total video bitrate and 3 Mbps must be sufficient for the SD layer, or 3) 9 Mbps must be used for the total video bitrate and H.26L must provide 2.5× improvement over MPEG-2.

For the scalability case, the performance would not be sufficient for borderline cases where 1) the formula used to compute the equivalent MPEG-2 HD bitrate is too optimistic, or 2) only 7 Mbps is allowed for the total bitrate and the modified H.26L does not provide 2.5× improvement over MPEG-2, or 3) 4 Mbps must be used for the SD layer, a total video bitrate of 9 Mbps is not allowed, and H.26L does not provide 2.5× improvement.

Thus, embodiments of the present invention allow two versions of a movie, one standard-definition ("SD") and one high-definition ("HD"), to be read from a dual-layer, single-sided, red laser DVD disc without the need to store the information included in the SD version a second time as part of the HD version. The coding is done using a hybrid MPEG-2 and modified H.26L scalability. The use of MPEG-2 for the base layer provides an SD bitstream that can be played by a current SD DVD player. The enhancement layer is coded using a modified H.26L (also known as JVT or MPEG-4 Part 10 or AVC) scheme to provide the coding efficiency needed to put both the SD and HD movies on a single disc. The present invention may also be applied to streaming and/or volatile content, such as, for example, streaming Internet video, in addition to DVD media.

The following description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually where the particular technique being selectable by the implementer is more specifically understood from the context.

In the claims hereof, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

As shown in FIG. 1, a hybrid scalable encoder is indicated generally by the reference numeral 100. The encoder 100 includes a two-layer decomposition unit 110 for receiving an original HD sequence. The decomposition unit 110 is coupled in signal communication with an MPEG-2 encoder 112 that receives the Base layer pixels from the decomposition unit and provides a Base layer bitstream output. The MPEG-2 encoder 112 is coupled to an SD frame buffer 114 and provides reconstructed base pixels to the buffer. The buffer 114 is coupled in feedback signal communication with the encoder 112, and is further coupled to an interpolator 116. The interpolator 116 is coupled to a first input of a summing block 118, which has its output coupled to a clipper 120. The clipper 120, in turn, is coupled to an HD frame buffer 122, which is coupled to a modified H.26L encoder 124. The encoder 124 has an input coupled to the decomposition unit 110 and an output coupled to a second input of the summing block 118 for providing reconstructed Enhancement layer pixels to the summing block. The encoder 124 provides an Enhancement layer bitstream output.

Figure 2:
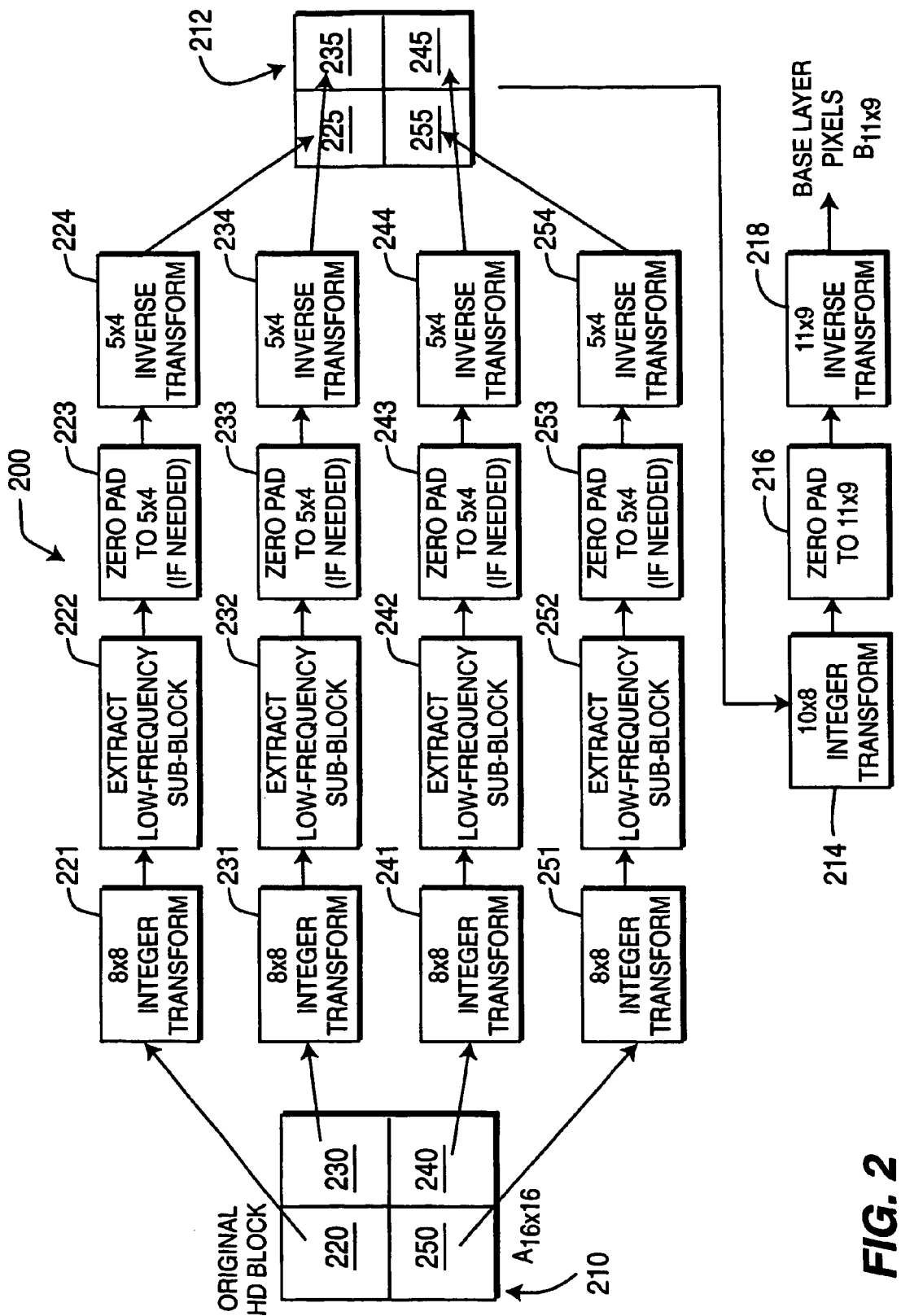
FIG. 2 shows a block diagram for a down-sampling algorithm usable with the encoder of FIG. 1, and in accordance with the principles of the present invention.

Turning to FIG. 2, a down-sampling algorithm is indicated generally by the reference numeral 200. Schematically, an original HD block 210 is $A_{16 \times 16}$ but is divided into four 8×8 sub-blocks 220, 230, 240 and 250, respectively. An 8×8 integer transform is applied in parallel to each of the sub-blocks by the 8×8 integer transformers 221, 231, 241 and 251, respectively. Next, low-pass filtering is performed on each of the transformed sub-blocks by low-frequency sub-block extractors 222, 232, 242 and 252, respectively. The low-pass filtered sub-blocks are then zero-padded to 5×4 sub-blocks, if needed, by the zero-padding blocks 223, 233, 243 and 253, respectively. Inverse transforms are then applied to each of the zero-padded sub-blocks by 5×4 inverse transformers 224, 234, 244 and 254, respectively, to provide new sub-blocks 225, 235, 245 and 255, respectively, that make up a new block 212. An integer transform is applied to the new block 212 by a 10×8 integer transformer 214, which is coupled to an 11×9 zero-padder 216. The zero-padder 216 is coupled, in turn, to an 11×9 inverse transformer 218 that provides the base layer pixels $B_{11 \times 9}$. An advantage of the downsampling method shown in FIG. 2, as compared to simply operating independently on 8×8 blocks, is more flexibility in the sample rate conversion ratio. For the particular embodiment shown in FIG. 2, the horizontal resolution of the SD layer is 9/16 of the HD horizontal resolution, and the vertical resolution of the SD layer is 11/16 of the HD vertical resolution. These ratios are not possible if 8×8 blocks are processed independently, since the conversion ratios would then be of the form P/8 for some integer P between 1 and 7.

Figure 3:
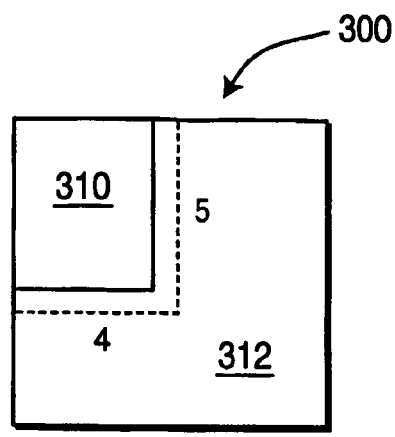
FIG. 3 shows a block diagram for transform coefficients usable with the encoder of FIG. 1, and in accordance with the principles of the present invention.

Turning now to FIG. 3, an 8×8 sub-block is indicated generally by the reference numeral 300. The sub-block 300 corresponds to the sub-blocks 220, 230, 240 and 250 of FIG. 2. The sub-block 300 includes base layer 310 and enhancement layer 312 transform coefficients, where, for the base layer, a subset of the 5×4 sub-block of coefficients 310 in the upper left corner of each 8×8 coefficient block is extracted. The remaining coefficients 312 in the 8×8 block are enhancement layer coefficients.

Figure 4:
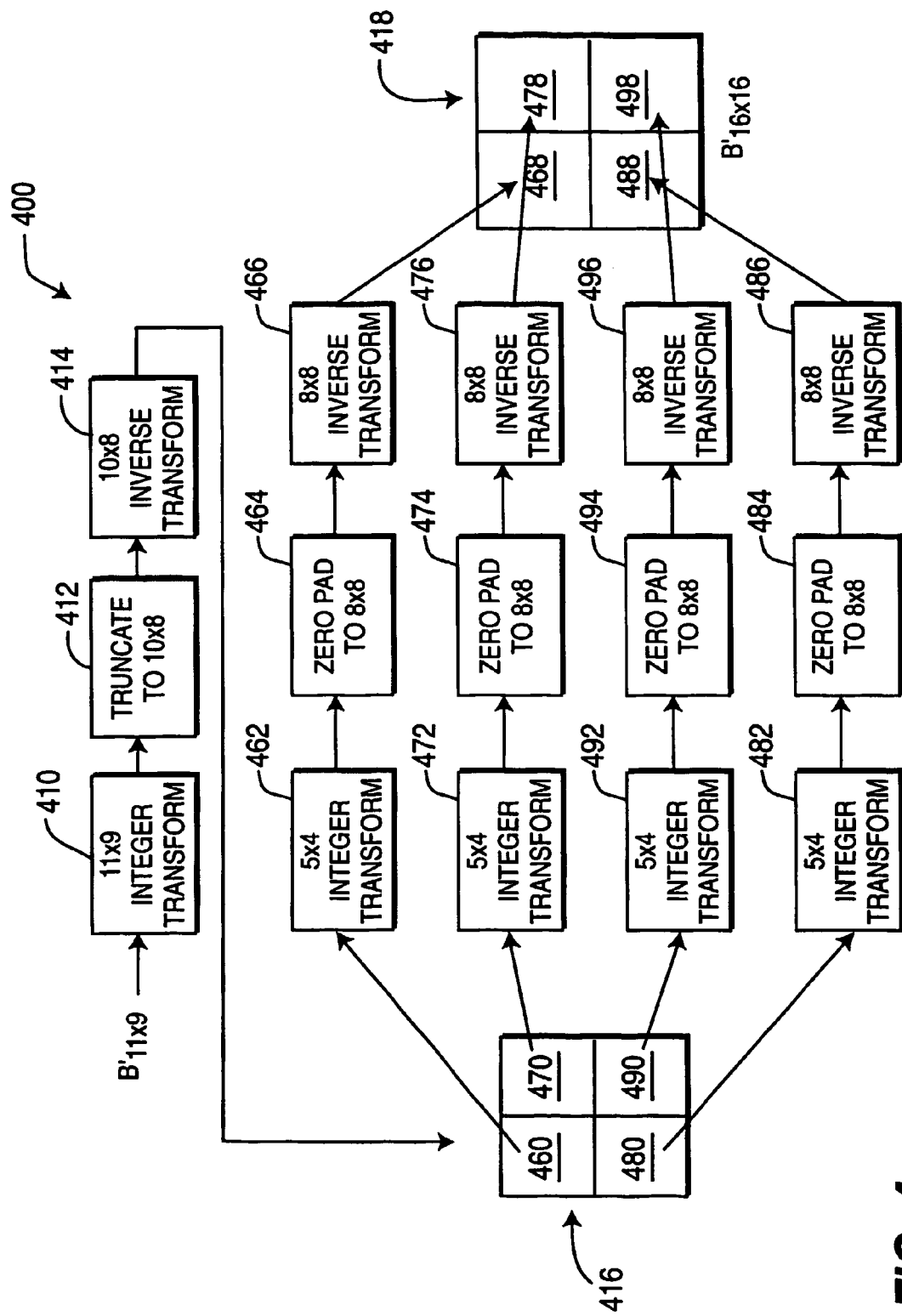
FIG. 4 shows a block diagram for an interpolation algorithm usable with the encoder of FIG. 1, and in accordance with the principles of the present invention.

As shown in FIG. 4, an interpolation algorithm is indicated generally by the reference numeral 400. The algorithm 400 includes an 11×9 integer transformer 410 for transforming the reconstructed version of $B_{11 \times 9}$, denoted $B'_{11 \times 9}$. The block 410 leads to a 10×8 truncation block 412, which leads to a 10×8 inverse transform block 414 that outputs an intermediate block 416. The block 416 includes four sub-divided sub-blocks 460, 470, 480 and 490, respectively. An integer transform is applied to each of these sub-blocks by 5×4 integer transformers 462, 472, 482 and 492, respectively. Next, the transformed sub-blocks are zero-padded by 8×8 zero-padders 464, 474, 484 and 494, respectively. The zero-padded transformed sub-blocks are then treated to an inverse transform by 8×8 inverse transformers 466, 476, 486 and 496, respectively, to form corresponding new sub-blocks 468, 478, 488 and 498, which collectively make-up the $B'_{16 \times 16}$ block 418.

Figure 5:
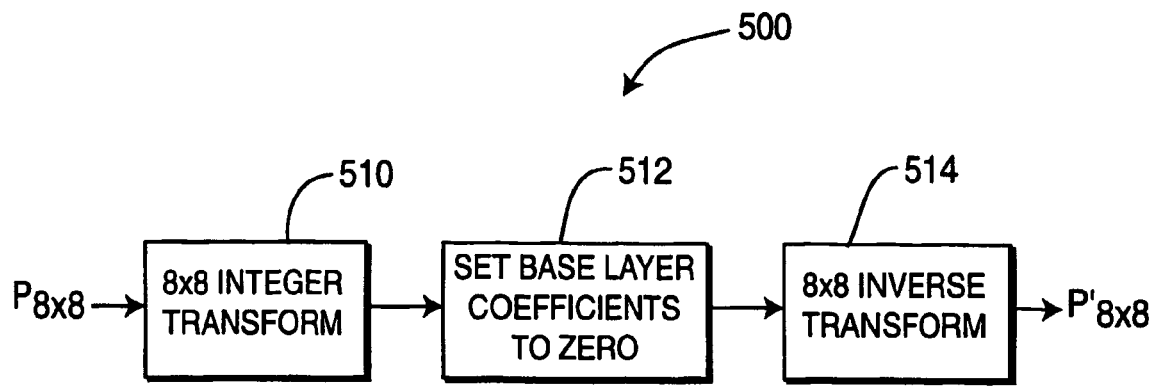
FIG. 5 shows a block diagram for motion compensation filtering usable with the encoder of FIG. 1, and in accordance with the principles of the present invention.

Turning to FIG. 5, a motion compensation filter is indicated generally by the reference numeral 500. The filter 500 includes an 8×8 integer transformer 510 for transforming the input, $P_{8 \times 8}$. The transformer 510 is coupled to an assignment unit 512 for setting the base layer coefficients to zero. The assignment unit 512, in turn, is coupled to an 8×8 inverse transformer 514 for providing the output, $P'_{8 \times 8}$.

Figure 6:
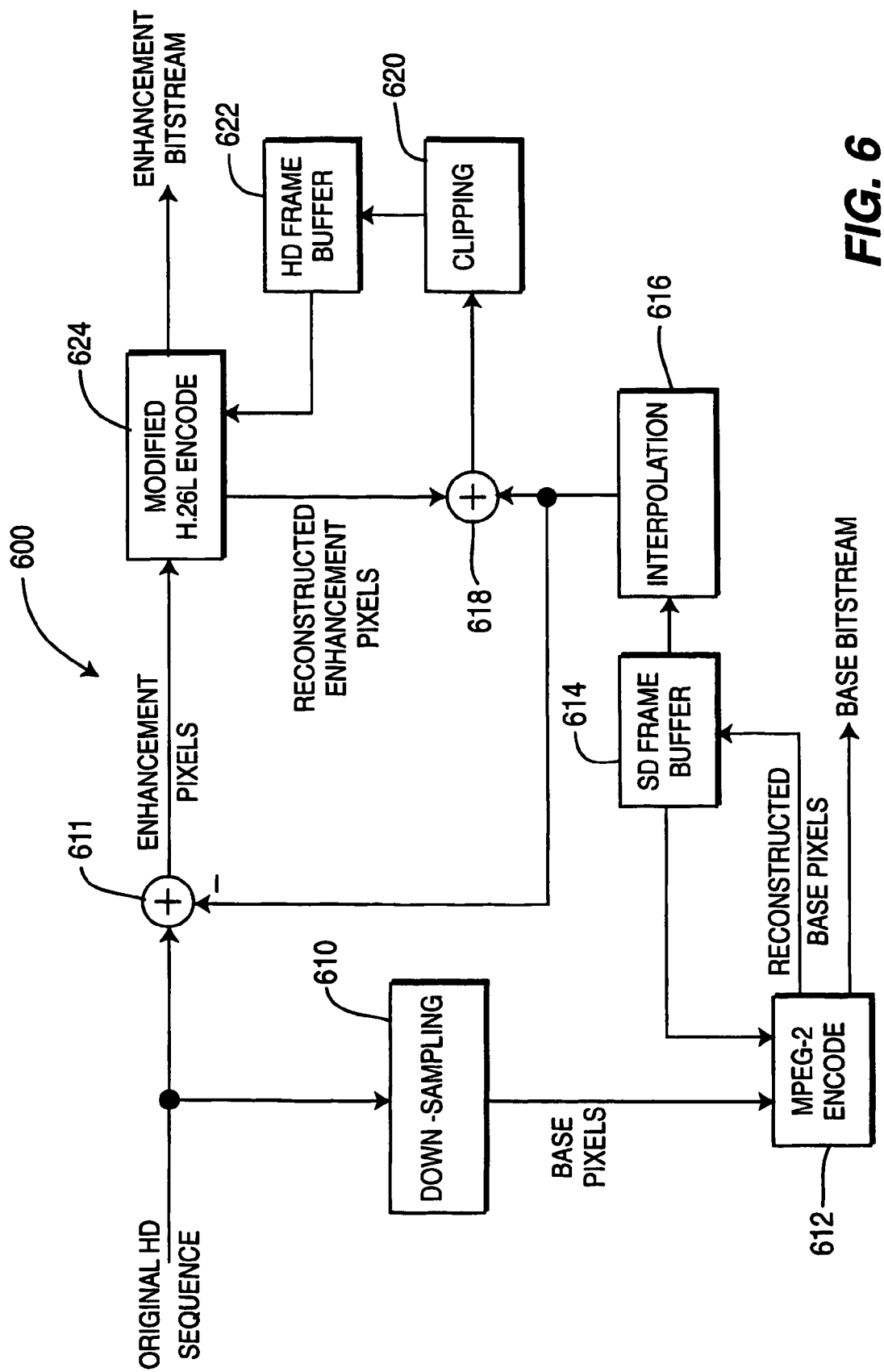
FIG. 6 shows a block diagram for another embodiment of a hybrid scalable encoder in accordance with the principles of the present invention.

Turning now to FIG. 6, another embodiment of a hybrid scalable encoder is indicated generally by the reference numeral 600. The encoder 600 is similar to the encoder 100 of FIG. 1, but has a downsampling unit for completing the decomposition. Thus, the encoder includes a downsampling unit 610 for receiving an original HD sequence and downsampling to provide Base layer pixels. The encoder 600 also includes a first summing block 611 for receiving the original HD sequence at a non-inverting input. The downsampling unit 610 is coupled in signal communication with an MPEG-2 encoder 612 that receives the Base layer pixels from the downsampling unit and provides a Base layer bitstream output. The MPEG-2 encoder 612 is coupled to an SD frame buffer 614 and provides reconstructed base pixels to the buffer. The buffer 614 is coupled in feedback signal communication with the encoder 612, and is further coupled to an interpolator 616. The interpolator 616 is coupled to an inverting input of the first summing block 611. The interpolator 616 is further coupled to a first input of a second summing block 618, which has its output coupled to a clipper 620. The clipper 620, in turn, is coupled to an HD frame buffer 622, which is coupled to a modified H.26L encoder 624. The encoder 624 has an input coupled to the output of the first summing block 611 for receiving Enhancement layer pixels, and an output coupled to a second input of the second summing block 618 for providing reconstructed Enhancement layer pixels to the second summing block 618. The encoder 624 provides an Enhancement layer bitstream output.

Figure 7:
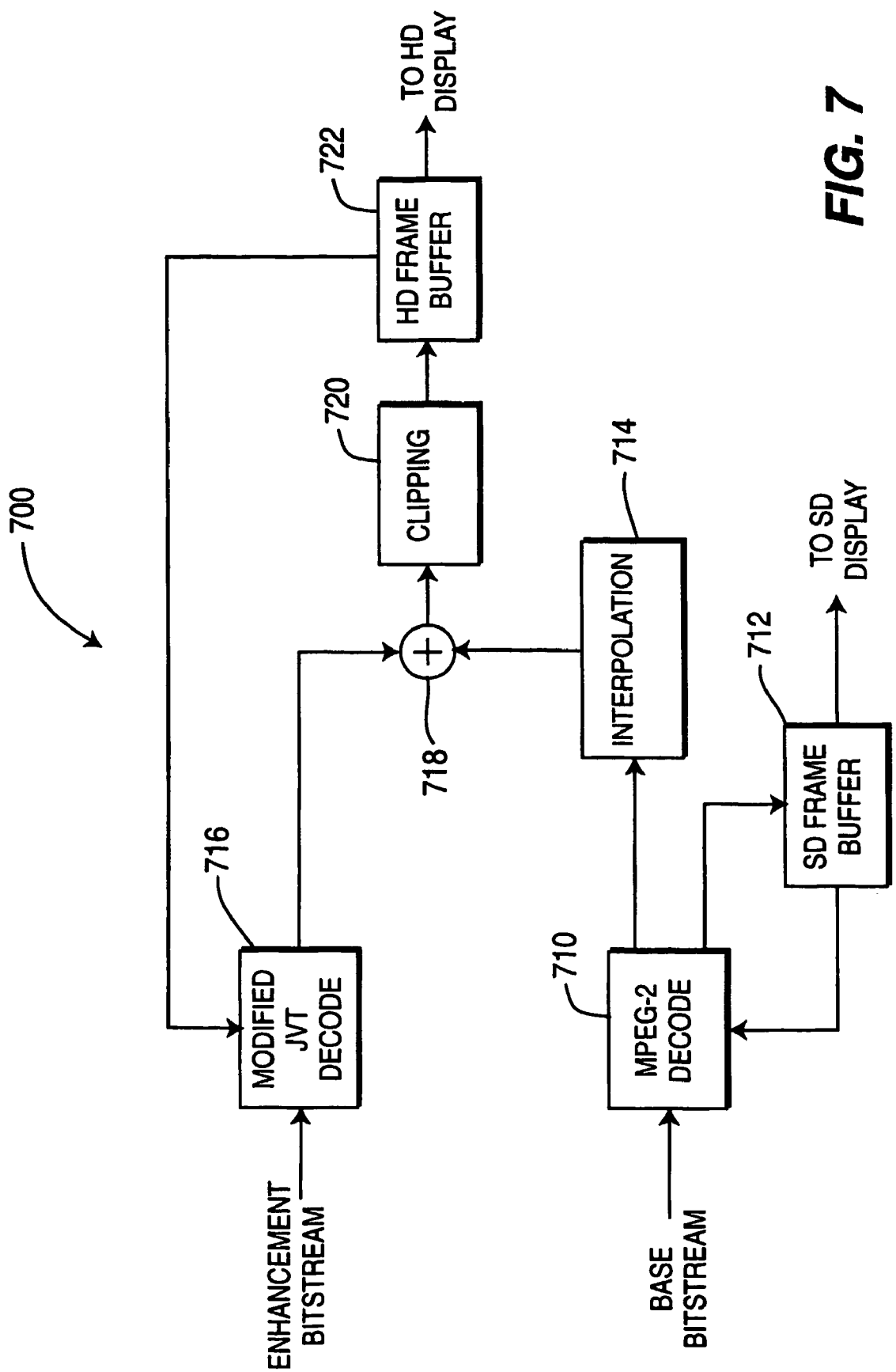
FIG. 7 shows a block diagram for a hybrid scalable decoder in accordance with the principles of the present invention.

As shown in FIG. 7, a hybrid scalable decoder is indicated generally by the reference numeral 700. The decoder 700 includes an MPEG-2 decoder 710 for receiving a Base layer bitstream. The MPEG-2 decoder is coupled to an SD frame buffer 712 for buffering the standard-definition frames. The SD frame buffer 712 provides an output suitable for an SD display, and is coupled back to the MPEG-2 decoder 710. The MPEG-2 decoder is further coupled to an interpolator 714, which is coupled, in turn, to a non-inverting input of a two-layer composition unit or summing block 718. The hybrid scalable decoder 700 further includes a modified JVT decoder 716 for receiving an Enhancement layer bitstream. The modified JVT decoder is coupled to a second non-inverting input of the summing block 718. The output of the summing block 718 is coupled to a clipping unit 720, which is coupled, in turn, to an HD frame buffer 722. The HD frame buffer 722 provides an output suitable for an HD display, and is also coupled back to the modified JVT decoder 716. In operation, the exemplary hybrid scalable scheme uses MPEG-2 encoding for the base layer and modified H.26L encoding for the enhancement layer. In the exemplary system, the resolution for the HD layer is 1280×720, and the SD layer is 704×480. FIG. 1 shows a high-level block diagram of an exemplary hybrid scalable encoder. First, the original HD material is decomposed into a base layer containing the low frequency content and an enhancement layer containing the high frequency content of the original sequence. The base layer is encoded using MPEG-2 (or other suitable SD scheme) and the enhancement layer is encoded using a modified version of H.26L (or other suitable HD scheme). In an exemplary embodiment of the present invention, the base and enhancement bitstreams are recorded on the disc in an interleaved fashion. The reconstructed HD frames are obtained by interpolating the reconstructed base layer pixels and adding the result to the reconstructed enhancement layer pixels.

An exemplary embodiment of the hybrid scalable decoder includes an MPEG-2 decoder, a modified H.26L decoder, and an interpolator for the base layer. The output of the interpolator and the H.26L decoder are summed to form the reconstructed HD frames.

To provide two-layer decomposition, FIG. 2 shows the algorithm for down-sampling the input HD block $A_{16\times16}$ to obtain the base layer pixel block $B_{11\times9}$. The amount of processing shown in FIG. 2 would be quite large, except that each step in the diagram can be written as a matrix transformation, so it is possible to implement the entire procedure as a post-multiplication by a matrix ($D_1$) for horizontal down-sampling followed by a pre-multiplication by a matrix ($D_2$) for vertical down-sampling.

In general, the transform-based down-sampling used to create the SD frames might be preferred, but there may be applications where alternate embodiment spatial-domain FIR filtering should be used to avoid artifacts that might arise from the transform type of filtering and/or down-sampling.

Referring back to FIG. 2, the first part of the down-sampling operates on 8×8 blocks. For the base layer, a subset of the 5×4 sub-block (or possibly the entire 5×4 sub-block) of coefficients in the upper left corner of each 8×8 coefficient block is extracted, as was shown in FIG. 3. The remaining coefficients in the 8×8 block, represented by the gray area in FIG. 3, are enhancement layer coefficients.

By putting a set of coefficients smaller than the 5×4 upper-left block into the base layer and then zero padding to 5×4, low-pass filtering of the base layer is accomplished. In terms of overall coding efficiency of the scalability scheme, putting a smaller number of coefficients into the base layer serves two purposes. First, more of the data is then encoded using the more efficient H.26L enhancement layer coding. Second, the smaller number of base layer coefficients can be coded to better accuracy in the base layer for a given base layer bitrate, and hence no refinement of these coefficients is needed in the enhancement layer. This is key to achieving the 90% efficiency used to compute the estimated performance numbers given in Table 1. The selection of coefficients for the base layer can be either pre-determined or adaptive in alternative embodiments. The down-sampling transformation matrices ($D_1$) and ($D_2$) depend on which coefficients are used in the base layer, so if the selection is adaptive either multiple versions of ($D_1$) and ($D_2$) are stored, or the processing in FIG. 2 is performed in two steps instead of one.

For base layer processing, the block $B_{11\times9}$ forms part of the SD frame. That SD frame is encoded using MPEG-2, and the reconstructed frame is stored in an SD frame buffer. The reconstructed version of $B_{11\times9}$, denoted $B'_{11\times9}$, is interpolated to form a 16×16 block $B'_{16\times16}$. The interpolation algorithm is shown in FIG. 4. As in the case of down-sampling, the interpolation can be implemented using two matrix multiplications. First a pre-multiplication by matrix ($D_4$) interpolates vertically, then a post-multiplication by ($D_3$) interpolates horizontally. The interpolated block $B'_{16\times16}$ is subtracted from the original data to form the enhancement layer block ($E_{16\times16}$).

The block ($E_{16\times16}$) is encoded using a modified version of H.26L for enhancement layer coding. The two modifications made to H.26L to encode the enhancement layer include:

a) An extra filtering step is used in the motion compensation unit. After the sub-pixel interpolation is performed, the low frequency content is removed from the prediction. The process used to perform this task is illustrated in FIG. 5. It can be implemented as a pre-multiplication by a matrix ($D_5$) and a post-multiplication by a matrix ($D_6$). The matrices ($D_5$) and ($D_6$) depend on which coefficients are coded in the base layer, so if the selection of base layer coefficients in the encoder is done adaptively, then that selection must be signaled to the decoder. This parameter could be changed only at the picture layer, in which case the overhead would not be significant.

b) The transform coefficients are scanned in a different order from non-scalable H.26L. The new scan order puts all of the base layer coefficients at the beginning, followed by the enhancement layer coefficients.

In addition to the two modifications made to the H.26L encoder, some restrictions are made on coding modes. First, the 4×4, 4×8, and 8×4 motion compensation modes of H.26L are not allowed in the enhancement layer. Experiments have indicated that these modes are not very useful at HD resolutions, so this constraint on the encoder shall not affect coding efficiency very much. The second restriction that is made is that only the 8×8 transform, which is part of the adaptive block transform feature of H.26L, is used for the luma.

Referring back to FIG. 1, the enhancement layer pixels are reconstructed and added to the interpolated reconstructed base layer pixels to form the reconstructed HD frames. These reconstructed HD frames are used as reference frames for coding of future enhancement layer data.

Interleaving of bitstreams on disc may be accomplished by one of two alternatives for storing the two layers on the disc. These are:

1) Using the multiple-angle/seamless-branching feature of DVD. The base stream would be stored as angle one, and the enhancement layer as other angles. Only angle one would be playable by the current DVD player. The current DVD standard specifies constraints for multiple angles and seamless branching (for example, maximum jump sectors, minimum buffer sectors) that, if met, should ensure seamless playback.

2) Using other stream IDs for the enhancement layer. Because current DVD only uses stream ID 0xE0 to store video streams, other stream IDs can be used to store the enhancement layer.

The present invention provides the ability to decode two bitstreams from a single disc at the same time to obtain the HD version, or to decode a single bitstream to obtain the SD version. Content providers may still have the option of releasing two separate discs for SD and HD in cases where they want to charge a premium for the HD version of a movie, for example. The new players will play a disc with a non-scalable H.26L stream, in addition to the scalable streams. Embodiments of the present invention may encourage content creators, video stores and consumers to build up stocks of HD material before the new HD players have reached an installed quantity that would justify creating, selling and buying HD-only discs.

Thus, preferred embodiments of the disclosed CODEC include two features: (i) a new method for downsampling that puts low frequency transform coefficients in the base layer and high frequency transform coefficients in the enhancement layer, with more flexibility in the sampling rate conversion ratio than previous methods; and (ii) a method for reducing the base layer bitrate that does not require refinement of the base layer coefficients in the enhancement layer.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A digital video disc encoded with signal data comprising a plurality of block transform coefficients for each of a base layer and an enhancement layer, the coefficients collectively indicative of an original high-definition signal data sequence, the base layer of the digital video disc having coefficients embodying a standard-definition data sequence in accordance with a first standard, and the enhancement layer of the digital video disc having coefficients embodying a difference between a high-definition data sequence and the standard-definition data sequence and encoded in accordance with a second standard, the first standard and the second standard being different standards, wherein the enhancement layer is interleaved using multiple-angle/seamless-branching feature of the digital video disc.

2. A digital video disc as defined in claim 1 wherein the base layer coefficients are encoded with an MPEG-2 code.

3. A digital video disc as defined in claim 2 wherein the enhancement layer coefficients are encoded with a modified H.26L code.

4. A digital video disc as defined in claim 1, wherein the enhancement layer is interleaved using multiple-angle/seamless-branching feature of the digital video disc such that the base layer is stored as a particular angle and the enhancement layer is stored as a different angle with respect to the particular angle.

5. A digital video disc encoded with signal data comprising a plurality of block transform coefficients for each of a base layer and an enhancement layer, the coefficients collectively indicative of an original high-definition signal data sequence, the base layer of the digital video disc having coefficients embodying a standard-definition data sequence in accordance with a first standard, and the enhancement layer of the digital video disc having coefficients embodying a difference between a high-definition data sequence and the standard-definition data sequence and encoded in accordance with a second standard, the first standard and the second standard being different standards, wherein the base layer coefficients are readable by a red laser video disc player.

6. A digital video disc as defined in claim 5, wherein the enhancement layer coefficients are readable by the red laser video disc player.

7. A digital video disc as defined in claim 5, wherein the base layer coefficients are encoded with an MPEG-2 code.

8. A digital video disc as defined in claim 7, wherein the enhancement layer coefficients are encoded with a modified H.26L code.

9. A digital video disc encoded with signal data comprising a plurality of block transform coefficients for each of a base layer and an enhancement layer, the coefficients collectively indicative of an original high-definition signal data sequence, the base layer of the digital video disc having coefficients embodying a standard-definition data sequence in accordance with a first standard, and the enhancement layer of the digital video disc having coefficients embodying a difference between a high-definition data sequence and the standard-definition data sequence and encoded in accordance with a second standard, the first standard and the second standard being different standards, wherein the enhancement layer is interleaved using a stream identification number for the enhancement layer other than 0xE0.

10. A digital video disc as defined in claim 9, wherein the base layer coefficients are readable by a red laser video disc player.

11. A digital video disc as defined in claim 10, wherein the enhancement layer coefficients are readable by the red laser video disc player.

12. A digital video disc as defined in claim 9, wherein the base layer coefficients are encoded with an MPEG-2 code.

13. A digital video disc as defined in claim 12, wherein the enhancement layer coefficients are encoded with a modified H.26L code.

* * * * *